US010819953B1

(12) United States Patent
Lovitt et al.

(10) Patent No.: US 10,819,953 B1
(45) Date of Patent: Oct. 27, 2020

(54) SYSTEMS AND METHODS FOR PROCESSING MIXED MEDIA STREAMS

(71) Applicant: Facebook Technologies, LLC, Menlo Park, CA (US)

(72) Inventors: Andrew Lovitt, Redmond, WA (US); Antonio John Miller, Woodinville, WA (US); Philip Robinson, Seattle, WA (US); Scott Selfon, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/172,711

(22) Filed: Oct. 26, 2018

(51) Int. Cl.
*H04N 7/15* (2006.01)
*G06F 3/01* (2006.01)
*G06F 3/16* (2006.01)
*H04R 25/00* (2006.01)
*H04R 5/033* (2006.01)
*G06F 16/40* (2019.01)

(52) U.S. Cl.
CPC ........... *H04N 7/157* (2013.01); *G06F 3/012* (2013.01); *G06F 3/165* (2013.01); *G06F 16/40* (2019.01); *H04N 7/152* (2013.01); *H04R 5/033* (2013.01); *H04R 25/40* (2013.01); *H04S 2400/11* (2013.01); *H04S 2420/01* (2013.01)

(58) Field of Classification Search
USPC ...................................................... 348/14.08
See application file for complete search history.

(56) References Cited

U.S. PATENT DOCUMENTS

| 2007/0127671 | A1* | 6/2007 | Chua ..................... H04M 3/002 |
| | | | 379/202.01 |
| 2009/0116563 | A1* | 5/2009 | Kawamura ............ H04N 5/265 |
| | | | 375/240.26 |
| 2011/0018960 | A1* | 1/2011 | Eshkoli ............... H04L 12/1822 |
| | | | 348/14.09 |
| 2013/0328998 | A1* | 12/2013 | Duckworth ............. G06F 3/147 |
| | | | 348/14.07 |

OTHER PUBLICATIONS

Haines et al., "Placement of Sound Sources In The Stereo Field Using Measured Room Impulse Responses", URL: https://www.cs.cmu.edu/~rbd/papers/reverb-lncs-preprint.pdf, 2008, pp. 1-9.
"ambisonic.net—where surround-sound comes to life", URL: http://www.ambisonic.net/, 2 pages.

* cited by examiner

*Primary Examiner* — Amal S Zenati
(74) *Attorney, Agent, or Firm* — FisherBroyles, LLP

(57) ABSTRACT

The disclosed computer-implemented method may include (1) receiving, at a first device, a first stream that includes first media data from a first media object, (2) receiving, at the first device, a second stream that includes second media data from a second media object, (3) mixing, at the first device, the first media data and the second media data into a third stream, (4) compiling, while mixing the third stream, a metadata stream that includes information enabling separation of the first media data and the second media data from the third stream, (5) transmitting, from the first device to a second device, the third stream, and (6) transmitting, from the first device to the second device, the metadata stream to enable the second device to separate the first media data and the second media data from the third stream. Various other methods, systems, and computer-readable media are also disclosed.

20 Claims, 13 Drawing Sheets

SYSTEMS AND METHODS FOR PROCESSING MIXED MEDIA STREAMS

BACKGROUND

Modern computing devices provide a myriad of communication options for users to conference and interact with one another. For example, users may employ voice-over-internet-protocol (VOIP) applications or other audio conferencing applications to communicate via voice, or video conferencing applications to communicate via video. Additionally, advances in virtual reality, augmented reality, and telepresence have also expanded the ways that users may conference and interact with each other in real, virtual, or mixed environments.

Unfortunately, traditional methods for hosting audio conferences, video conferences, or other forms of conferences between users may consume unwanted amounts of resources and/or present various unwanted limitations, especially when used to connect large numbers of users. For example, typical audio or video conferencing systems generally include a server-side component that (1) receives an audio and/or video stream for each user in a particular conference, (2) generates, for each user in the conference, a customized audio or video stream containing a mix of the audio and/or video streams of the other users in the conference, and (3) transmits the customized audio and video streams to their intended recipients. In such systems, the amount of resources needed to generate customized audio and video streams generally increases as the number of users in a conference increases. Since a user is presented with a single customized audio or video stream containing a mix of the audio and video streams of the other users in the user's conference, the user's ability to control the audio or video streams of the other users may be limited to processing the customized audio or video stream as a whole without the ability to process the audio or video streams of individual users. Some audio and video conferencing systems attempt to remedy this limitation by relaying individual audio and/or video streams to all users in a conference; however, this remedy generally requires considerably more bandwidth than the single stream method described above. Accordingly, the instant disclosure identifies and addresses a need for additional and improved systems and methods for hosting audio conferences, video conferences, or other forms of conferences between users.

SUMMARY

As will be described in greater detail below, the instant disclosure describes systems and methods for processing mixed media streams (e.g., mixed audio stream or mixed video streams) for audio conferencing, video conferencing, and other media streaming applications. In one example, a computer-implemented method for processing mixed media streams may include (1) receiving, at a first computing device, a first media stream (e.g., an audio or video stream) that includes first media data from a first media object (e.g., a participant of an audio conference or a video conference), (2) receiving, at the first computing device, a second media stream (e.g., another audio or video stream) that includes second media data from a second media object (e.g., another participant of the audio conference or the video conference), (3) mixing, at the first computing device, the first media data and the second media data into a third media stream, (4) compiling, while mixing the third media stream, a metadata stream that includes information enabling separation of the first media data and the second media data from the third media stream, (5) transmitting, from the first computing device to a second computing device, the third media stream, and (6) transmitting, from the first computing device to the second computing device, the metadata stream to enable the second computing device to separate the first media data and the second media data from the third media stream. In some examples, the computer-implemented method may further include (1) receiving, at the second computing device, the third media stream and the metadata stream, (2) using, at the second computing device, the metadata stream to separate the first media data and the second media data from the third media stream, and (3) differently processing, at the second computing device, the first media data and the second media data.

In some examples, the step of differently processing the first media data and the second media data may include spatially localizing, while presenting the first media data and the second media data to a user of the second computing device, the first media data and the second media data at different spatial locations in the user's auditory field. In at least one example, the second computing device may include a head-mounted device capable of measuring a head pose of the user of the second computing device, and the first media data and the second media data may be spatially localized relative to the head pose of the user of the second computing device. In other embodiments, the step of differently processing the first media data and the second media data may include independently adjusting a volume level of the first media data and a volume level of the second media data.

In some examples, the first media stream may be received from a third computing device, the first media object may be a user of the third computing device, the second media stream may be received from a fourth computing device, the second media object may be a user of the fourth computing device, and the first computing device may be a cloud-based server hosting a virtualized conference for a user of the second device, the user of the third device, and the user of the fourth device. In at least one example, the computer-implemented method may further include (1) receiving, at the first computing device, a fourth media stream that includes third media data from a third media object, (2) using a psychoacoustic model to predict that the user of the second computing device would be unable to perceive the third media data if presented to the user of the second computing device, and (3) refraining, at the first computing device, from mixing the third media data into the third media stream.

In some examples, the metadata stream may further include a label of the first media data and a label of the second media data. In one example, the first computing device may include a sensor array capable of spatial selectivity, the step of receiving the first media stream may include receiving the first media stream from a first direction in a sound field, the step of receiving the second media stream may include receiving the second media stream from a second direction in the sound field, the label of the first media data may include the first direction, and the label of the second media data may include the second direction.

In some examples, the first computing device may include a simultaneous mapping and localization (SLAM) subsystem configured to map the environment of the first computing device and localize the first computing device within the environment, the step of receiving the first media stream may include receiving the first media stream from a first object in the environment, the step of receiving the second media stream may include receiving the second media stream from a second object in the environment, the label of the first media data may include an attribute of the first object, and the label of the second media data may include an attribute of the second object. In other embodiments, the step of mixing the first media data and the second media data into the third media stream may include performing a convolution operation on the first media data and the second media data to produce the third media stream, and the information enabling separation of the first media data and the second media data from the third media stream may include information enabling a deconvolution operation to be performed on the third media stream to produce the first media data and the second media data.

In another example, a computer-implemented method for processing mixed audio streams may include (1) receiving, at a first computing device from a second computing device, a media stream that includes first media data from a first media object and second media data from a second media object, (2) receiving, at the first computing device from the second computing device, a metadata stream that includes information enabling separation of the first media data and the second media data from the media stream, (3) using, at the first computing device, the metadata stream to separate the first media data and the second media data from the third media stream, (4) differently processing, at the first computing device, the first media data and the second media data, and (5) presenting, to a user of the first computing device, the first media data and/or the second media data. In this example, the second computing device may have mixed the first media data and the second media data into the media stream. In some examples, the step of differently processing the first media data and the second media data may include spatially localizing, before presenting the first media data and the second media data, the first media data and the second media data at different spatial locations in the user's auditory field. In at least one example, the computer-implemented method may further include measuring a head pose of the user, and the first media data and the second media data may be spatially localized relative to the head pose of the user. In some embodiments, the step of differently processing the first media data and the second media data may include independently adjusting a volume level of the first media data and a volume level of the second media data.

In addition, a corresponding system for processing mixed media streams may include at least one physical processor and physical memory with computer-executable instructions that, when executed by the physical processor, cause the physical processor to (1) receive, at a first computing device, a first media stream that includes first media data from a first media object, (2) receive, at the first computing device, a second media stream that includes second media data from a second media object, (3) mix, at the first computing device, the first media data and the second media data into a third media stream, (4) compile, while mixing the third media stream, a metadata stream that includes information enabling separation of the first media data and the second media data from the third media stream, (5) transmit, from the first computing device to a second computing device, the third media stream, and (6) transmit, from the first computing device to the second computing device, the metadata stream to enable the second computing device to separate the first media data and the second media data from the third media stream. In some examples, the first media stream may be received from a third computing device, the first media object may be a user of the third computing device, the second media stream may be received from a fourth computing device, the second media object may be a user of the fourth computing device, and the first computing device be a cloud-based server hosting a virtualized conference for a user of the second device, the user of the third device, and the user of the fourth device.

In some examples, the physical memory may further include additional computer-executable instructions that, when executed by the physical processor, cause the physical processor to also (1) receive, at the first computing device, a fourth media stream that includes third media data from a third media object, (2) use a psychoacoustic model to predict that the user of the second computing device would be unable to perceive the third media data if presented to the user of the second computing device, and (3) refrain, at the first computing device, from mixing the third media data into the third media stream.

In some examples, the metadata stream may further include a label of the first media data and a label of the second media data. In one example, the first computing device may include a sensor array capable of spatial selectivity, and the sensor array may receive the first media stream from a first direction in a sound field and the second media stream from a second direction in the sound field. In such examples, the label of the first media data may include the first direction, and the label of the second media data may include the second direction. In another example, the first computing device may include a simultaneous mapping and localization subsystem configured to map the environment of the first computing device and localize the first computing device within the environment, the first media stream may be received from a first object in the environment, and the second media stream may be received from a second object in the environment. In such examples, the label of the first media data may include an attribute of the first object, and the label of the second media data may include an attribute of the second object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
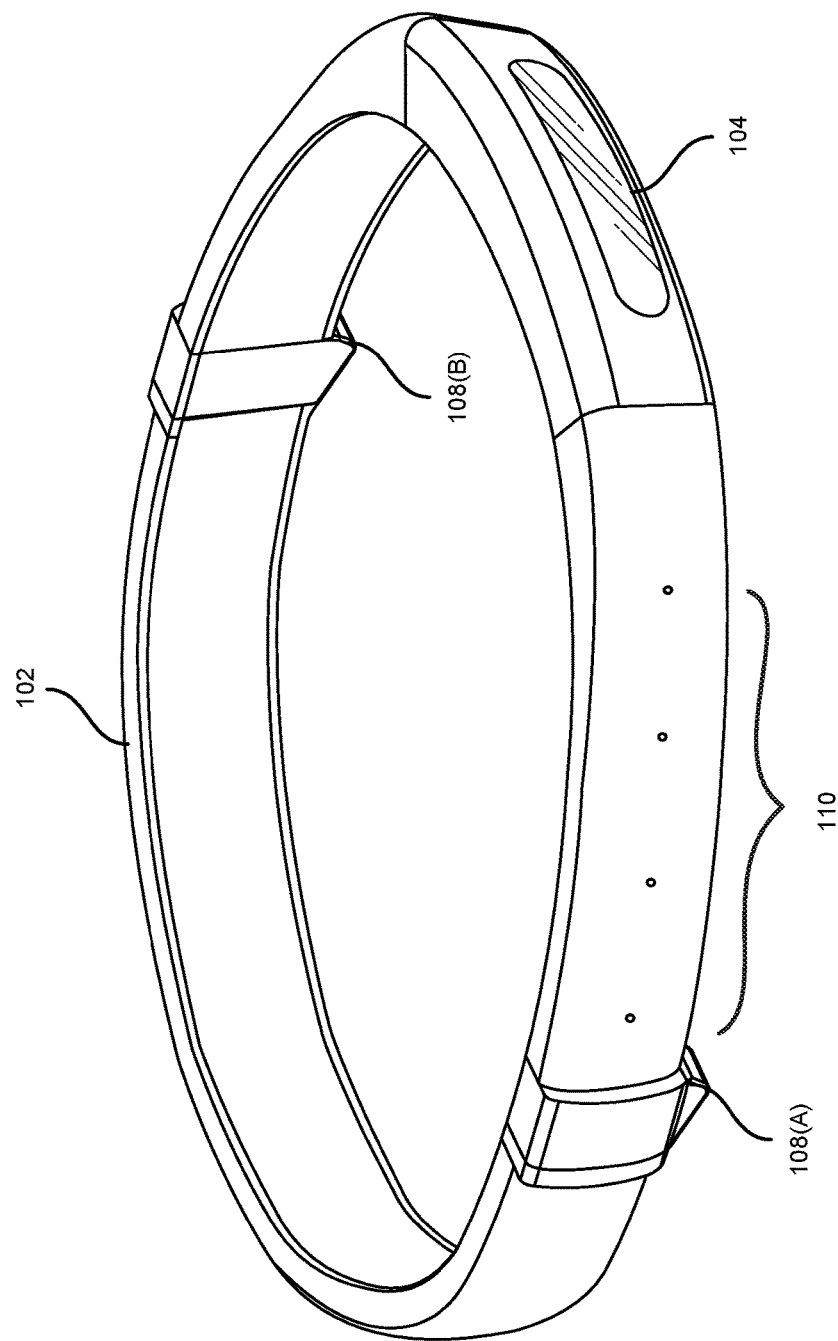
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for processing mixed media streams (e.g., mixed audio streams or mixed video streams) for audio conferencing, video conferencing, and other media streaming applications. As will be explained in greater detail below, embodiments of the instant disclosure may mix individual media streams from two or more sources into a single mixed media stream that may be sent to a remote device for additional processing or presentation. Embodiments of the instant disclosure may compile additional side-channel information that distinguishes/spatializes the individual media streams within the mixed media stream and may send the additional side-channel information to the remote device to enable the remote device to extract and/or process the individual media streams from the mixed media stream. By enabling the remote device to extract and/or process individual media streams from a single mixed media stream, embodiments of the instant disclosure may enable the remote device to amplify or attenuate individual media streams or remix the mixed media stream to re-localize the individual media streams before presentation to a user. Accordingly, the disclosed systems may improve upon existing audio conferencing, video conferencing, and other media streaming technologies by, among other things, providing a user with a single mixed audio or video stream containing a mix of the audio and video streams of the other users in the user's conference from which the user may extract and individually process or control the audio or video streams of the other users. Embodiments of the instant disclosure may also provide various other advantages and features, as discussed in greater detail below.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

Figure 2:
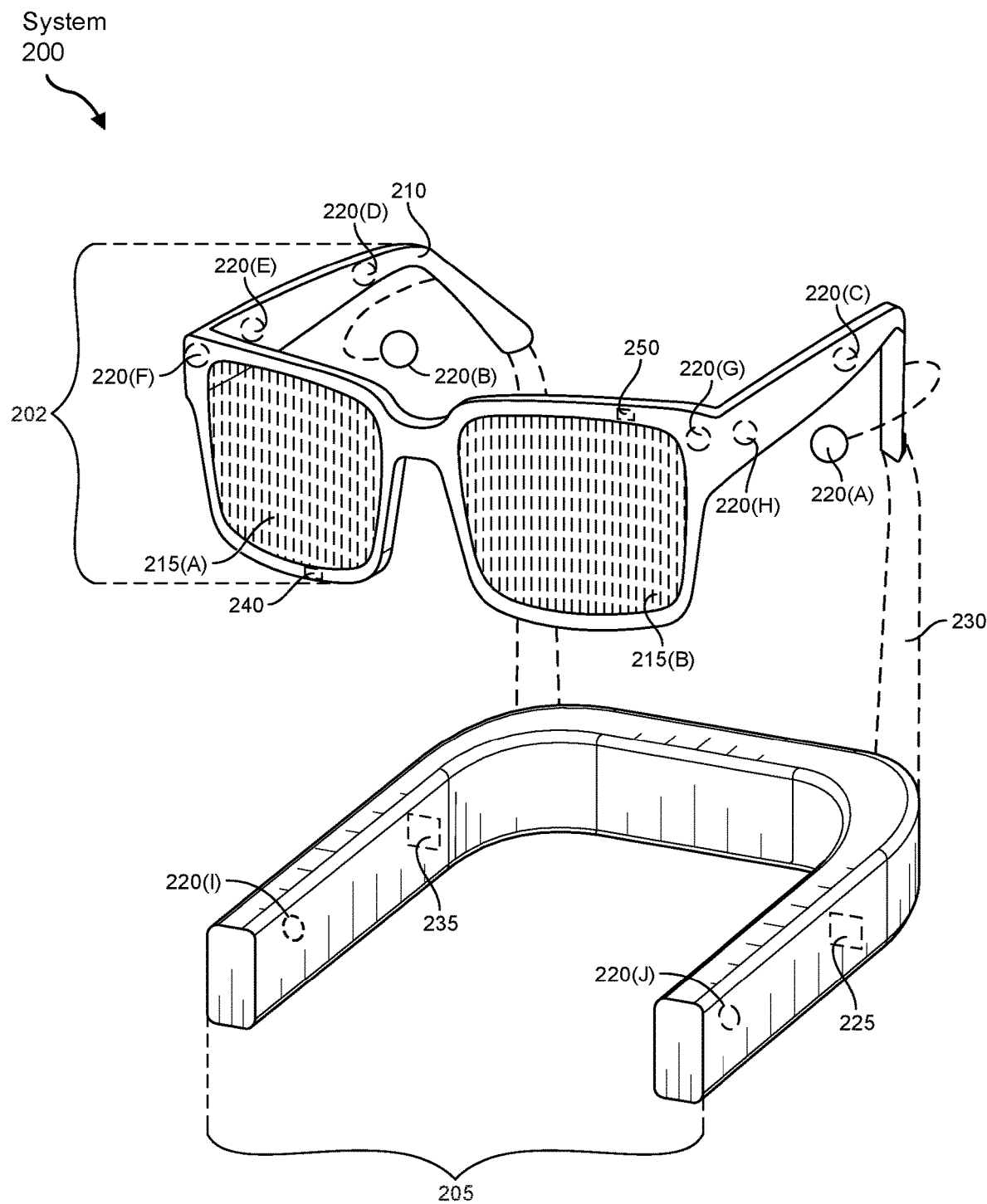
FIG. 2 illustrates an embodiment of an augmented reality headset and a corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by a controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(I) and 220(J)) that are part of the microphone array (or potentially form their own microphone subarray). Neckband 205 may also include a controller 225 and a power source 235.

Acoustic sensors 220(I) and 220(J) of neckband 205 may be configured to detect sound and convert the detected sound into an electronic format (analog or digital). In the embodiment of FIG. 2, acoustic sensors 220(I) and 220(J) may be positioned on neckband 205, thereby increasing the distance between neckband acoustic sensors 220(I) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DOA) estimation to estimate a direction from which the detected sound arrived at the microphone array. As the microphone array detects sounds, controller 225 may populate an audio data set with the information. In embodiments in which AR system 200 includes an IMU, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to a user.

Power source 235 in neckband 205 may provide power to eyewear device 202 and/or to neckband 205. Power source 235 may include, without limitation, lithium-ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more IMUs, one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
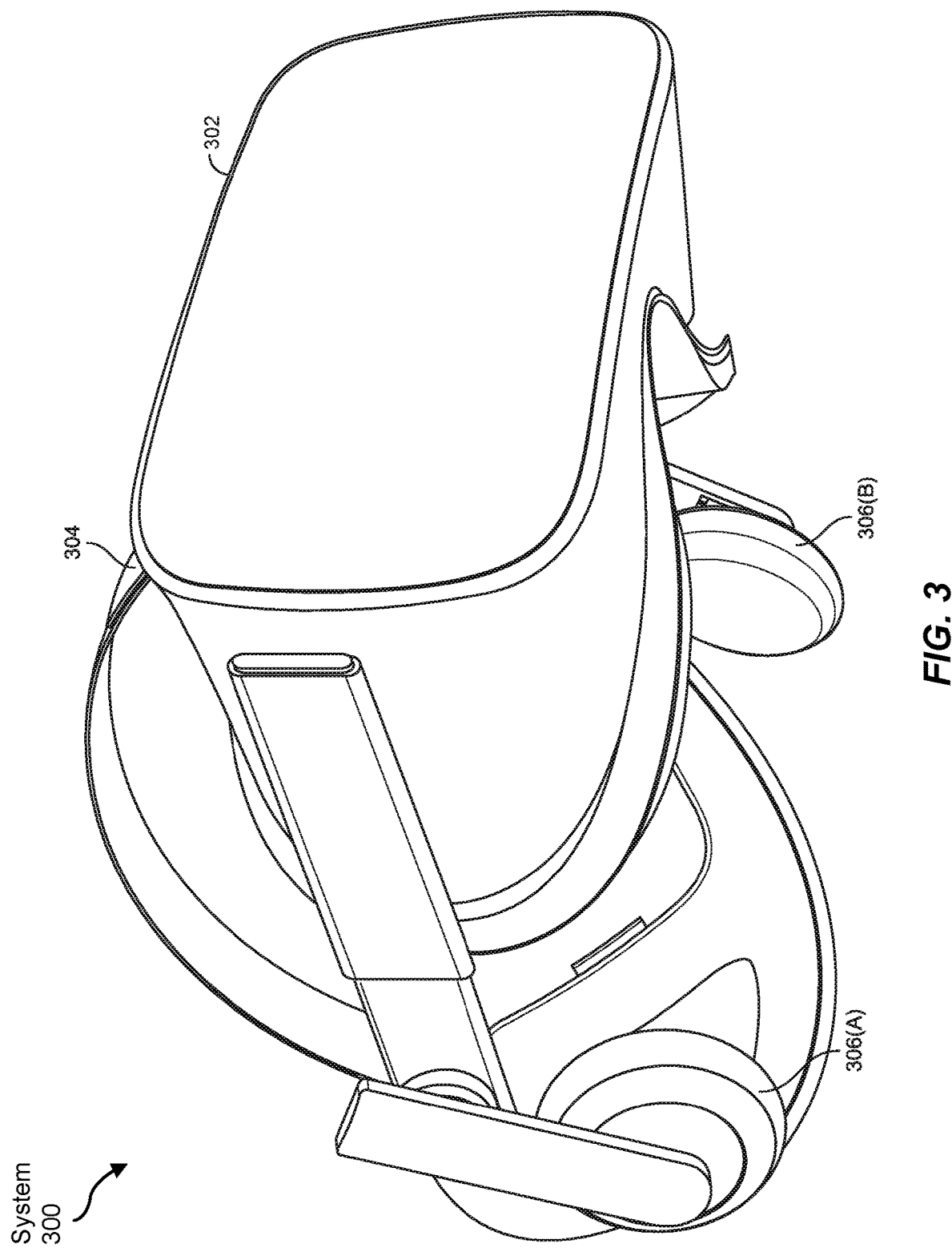
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1-3, respectively) may incorporate any or all of these types of sensors to perform SLAM operations such as creating and continually updating maps of a user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Figure 4:
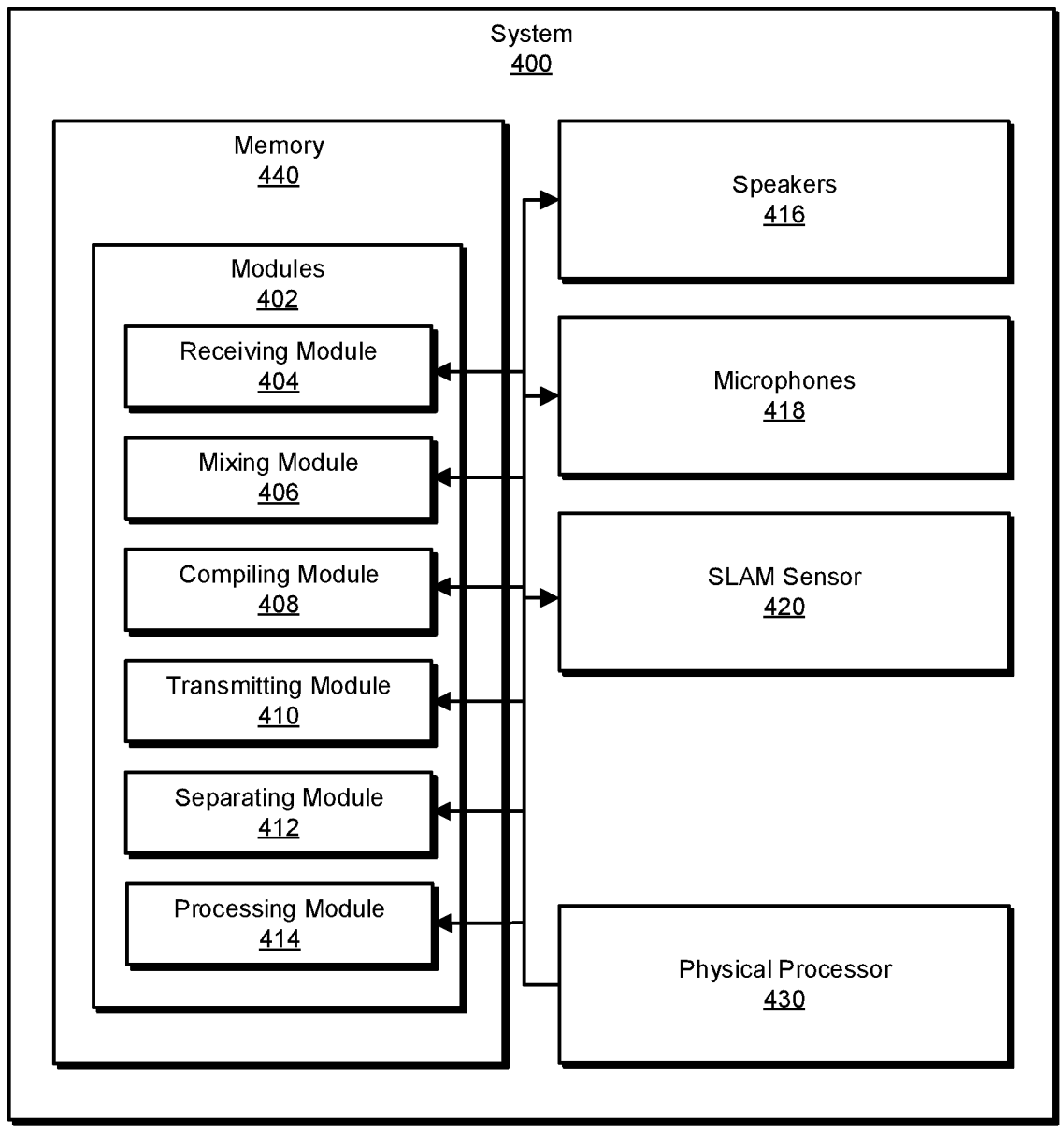
FIG. 4 is a block diagram of an exemplary system for processing mixed media streams, according to aspects of the present disclosure.

FIG. 4 is a block diagram of an exemplary system 400 for processing mixed media streams. As illustrated in this figure, example system 400 may include one or more modules 402 for performing one or more tasks. As will be explained in greater detail below, modules 402 may include a receiving module 404 configured to receive media streams that include media data (e.g., audio data or video data) from various media objects (e.g., users, devices, transducers, cameras, or other media sources). Modules 402 may also include a mixing module 406 configured to mix media data from multiple media streams into a single mixed media stream, a compiling module 408 configured to compile a metadata stream that includes information enabling extraction of the media data from the multiple media streams from the mixed media stream, and a transmitting module 410 configured to transmit the mixed media stream and the metadata stream to a computing device to enable the computing device to extract the media data from the multiple media streams from the mixed media stream.

In some examples, receiving module 404 may also be configured to receive (1) a mixed media stream that includes media data from multiple media streams and (2) a metadata stream that includes information enabling separation of the media data from the multiple media streams from the mixed media stream. Modules 402 may also include a separating module 412 configured to use the metadata stream to separate the media data from the multiple media streams from the mixed media stream and a processing module 414 configured to independently process the media data from the multiple media streams.

In certain embodiments, one or more of modules 402 in FIG. 4 may represent one or more software applications or programs that, when executed by a computing device, may cause the computing device to perform one or more tasks. For example, and as will be described in greater detail below, one or more of modules 402 may represent modules stored and configured to run on one or more computing devices, such as the devices illustrated in FIG. 5 (e.g., computing device 502 and/or computing device 506) or the devices illustrated in FIG. 6 (e.g., computing device 602, computing device 604, computing device 606, and/or server 610). One or more of modules 402 in FIG. 4 may also represent all or portions of one or more special-purpose computers configured to perform one or more tasks.

As illustrated in FIG. 4, example system 400 may also include one or more memory devices, such as memory 440. Memory 440 generally represents any type or form of volatile or non-volatile storage device or medium capable of storing data and/or computer-readable instructions. In one example, memory 440 may store, load, and/or maintain one or more of modules 402. Examples of memory 440 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 440. Examples of physical processor 430 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 4, example system 400 may also include one or more additional elements, such as speakers 416 capable of presenting audio data, microphones 418 capable of capturing audio data, and SLAM sensor 420 capable of simultaneously mapping a device's environment and localizing the device's position and orientation within the environment. In some examples, speakers 416 and/or microphones 418 may be configured for and capable of spatial selectivity (e.g., beamforming). While not illustrated in FIG. 4, example system 400 may also include additional elements for capturing and presenting audio, video, or other types of media.

Figure 5:
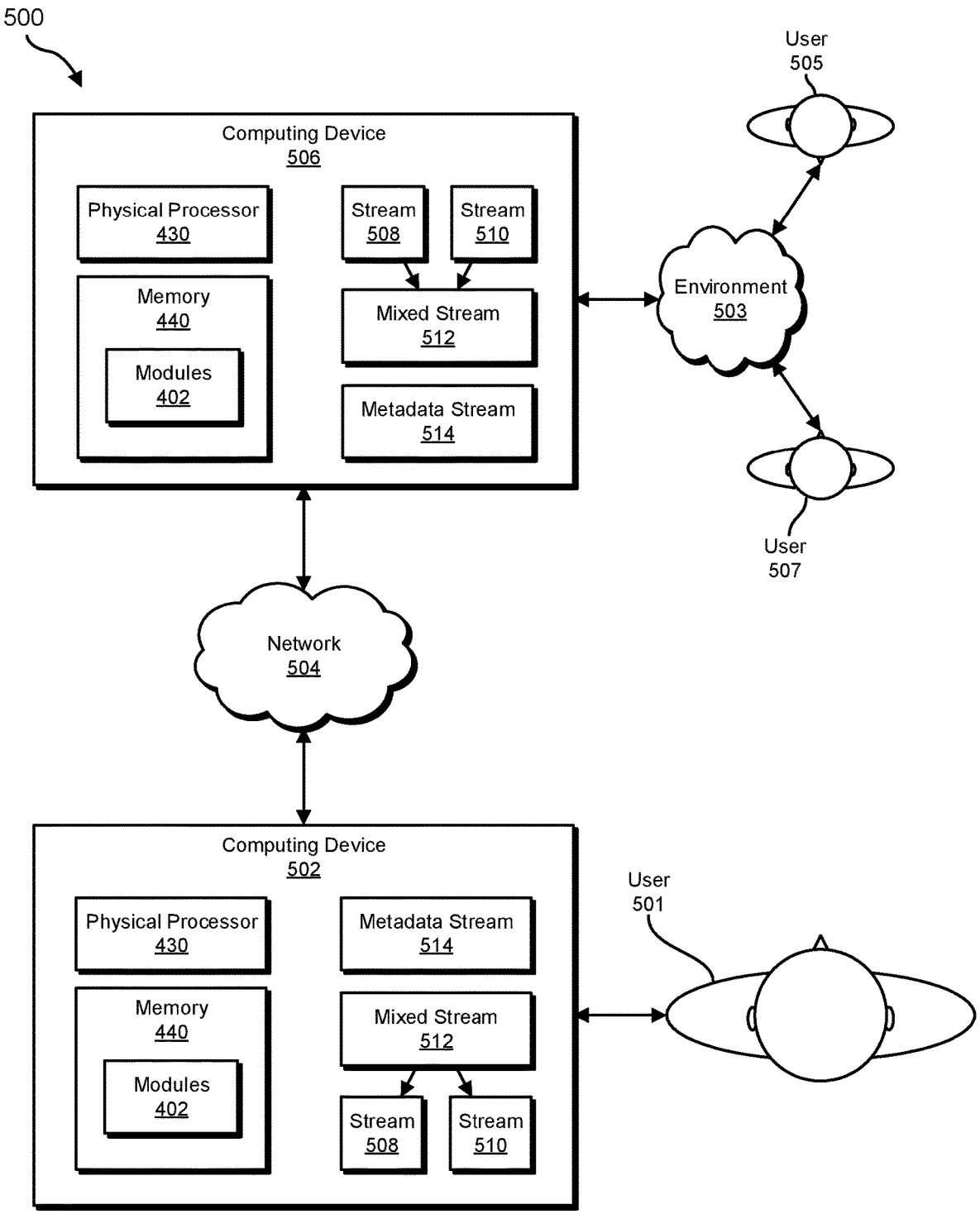
FIG. 5 is a block diagram of another exemplary system for processing mixed media streams, according to aspects of the present disclosure.

Example system 400 in FIG. 4 may be implemented in a variety of ways. For example, all or a portion of example system 400 may represent portions of an example system 500 in FIG. 5. As shown in FIG. 5, system 500 may include a computing device 502 of a user 501 in communication with a computing device 506 of users 505 and 507 via network 504. In at least one example, computing device 502 may be programmed with one or more of modules 402. Additionally or alternatively, computing device 506 may be programmed with one or more of modules 402.

In at least one embodiment, one or more modules 402 from FIG. 4 may, when executed by computing device 502 and/or computing device 506, enable computing device 502 and/or computing device 506 to perform one or more operations to process a mixed media stream 512. For example, as will be described in greater detail below, one or more modules 402 from FIG. 4 may, when executed by computing device 502, enable computing device 502 to (1) receive a media stream 508 that includes media data from user 505 and a media stream 510 that includes media data from user 507, (2) mix media stream 508 and media stream 510 into mixed media stream 512, (3) compile a metadata stream 514 that includes information enabling separation of media stream 508 and media stream 510 from mixed media stream 512, (4) transmit mixed media stream 512 and metadata stream 514 to computing device 502 to enable computing device 502 to separate media stream 508 and media stream 510 from mixed media stream 512. In some examples, as will be described in greater detail below, one or more modules 402 from FIG. 4 may, when executed by computing device 502, enable computing device 502 to receive mixed media stream 512 and metadata stream 514 from computing device 506, use metadata stream 514 to separate media stream 508 and media stream 510 from mixed media stream 512, and differently process media stream 508 and media stream 510 before presenting media stream 508 and/or media stream 510 to user 501.

Computing device 502 and computing device 506 generally represent any type or form of computing device capable of reading and/or executing computer-executable instructions. Examples of computing device 502 and computing device 506 include, without limitation, servers, desktops, laptops, tablets, cellular phones, (e.g., smartphones), personal digital assistants (PDAs), multimedia players, AR and VR devices (such as systems 100, 200, and 300 of FIGS. 1-3, respectively), embedded systems, wearable devices (e.g., smart watches, smart glasses, head-mounted displays, etc.), audio or video conferencing systems, gaming consoles, combinations of one or more of the same, or any other suitable computing device. In some examples, computing device 506 may include one or more microphones 418 for capturing, via environment 503 of computing device 506, audio data from user 505 and user 507.

Network 504 generally represents any medium or architecture capable of facilitating communication and/or data transfer between computing device 502 and/or computing device 506. Examples of network 504 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, one or more proprietary data connections, and the like. Network 504 may facilitate communication or data transfer using wireless or wired connections. In one embodiment, network 504 may facilitate communication between computing device 502 and computing device 506.

Figure 6:
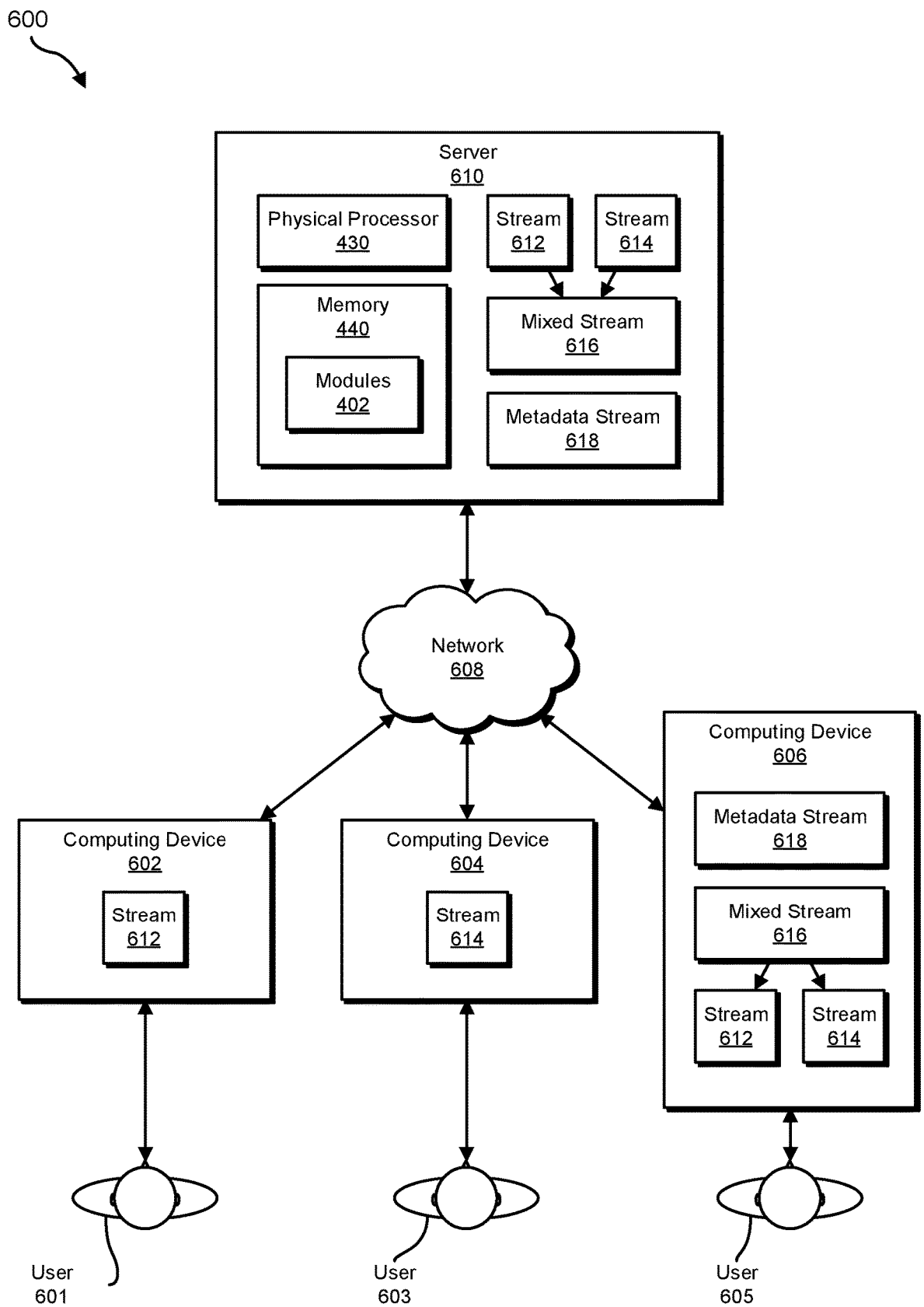
FIG. 6 is a block diagram of another exemplary system for processing mixed media streams, according to aspects of the present disclosure.

In addition to the exemplary implementation shown in FIG. 5, example system 400 in FIG. 4 may be implemented in various other ways. For example, all or a portion of example system 400 may represent portions of an example system 600 in FIG. 6. As shown in FIG. 6, system 600 may include a computing device 602 of a user 601, a computing device 604 of a user 603, and a computing device 606 of a user 605 in communication with a server 610 via network 608. In at least one example, computing devices 602, 604, and 606 may be programmed with one or more of modules 402. Additionally or alternatively, server 610 may be programmed with one or more of modules 402.

In at least one embodiment, one or more modules 402 from FIG. 4 may, when executed by computing devices 602-606 and/or server 610, enable computing devices 602-606 and/or server 610 to perform one or more operations to process a mixed media stream 616. For example, as will be described in greater detail below, one or more modules 402 from FIG. 4 may, when executed by server 610, enable server 610 to (1) receive, from computing device 602, a media stream 612 that includes media data from user 601, (2) receive, from computing device 604, a media stream 614 that includes media data from user 603, (3) mix media stream 612 and media stream 614 into mixed media stream 616, (4) compile a metadata stream 618 that includes information enabling separation of media stream 612 and media stream 614 from mixed media stream 616, (4) transmit mixed media stream 616 and metadata stream 618 to computing device 606 to enable computing device 606 to separate media stream 612 and media stream 614 from mixed media stream 616. In some examples, as will be described in greater detail below, one or more modules 402 from FIG. 4 may, when executed by computing device 606, enable computing device 606 to receive mixed media stream 616 and metadata stream 618 from server 610, use metadata stream 618 to separate media stream 612 and media stream 614 from mixed media stream 616, and differently process media stream 612 and media stream 614 before presenting media stream 612 and/or media stream 614 to user 605.

Computing devices 602, 604, and 606 generally represent any type or form of computing device capable of reading and/or executing computer-executable instructions. Examples of computing devices 602, 604, and 606 include, without limitation, servers, desktops, laptops, tablets, cellular phones, (e.g., smartphones), personal digital assistants (PDAs), multimedia players, AR and VR devices (such as systems 100, 200, and 300 of FIGS. 1-3, respectively), embedded systems, wearable devices (e.g., smart watches, smart glasses, head-mounted displays, etc.), audio or video conferencing systems, gaming consoles, combinations of one or more of the same, or any other suitable computing device.

Server 610 generally represents any type or form of computing device that is capable of reading computer-executable instructions. Examples of server 610 include, without limitation, cloud-based application servers configured to provide various cloud-based services and/or run certain cloud-based software applications. In some examples, server 610 may represent a cloud-based portion of an audio or video conferencing system.

Network 608 generally represents any medium or architecture capable of facilitating communication and/or data transfer. Examples of network 608 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, one or more proprietary data connections, and the like. Network 608 may facilitate communication or data transfer using wireless or wired connections.

Many other devices or subsystems may be connected to system 400 in FIG. 4, system 500 in FIG. 5, and/or system 600 in FIG. 6. Conversely, all of the components and devices illustrated in FIGS. 4, 5, and 6 need not be present to practice the embodiments described and/or illustrated herein. The devices and subsystems referenced above may also be interconnected in different ways from those shown in FIGS. 4, 5, and 6. Systems 400, 500, and 600 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 7:
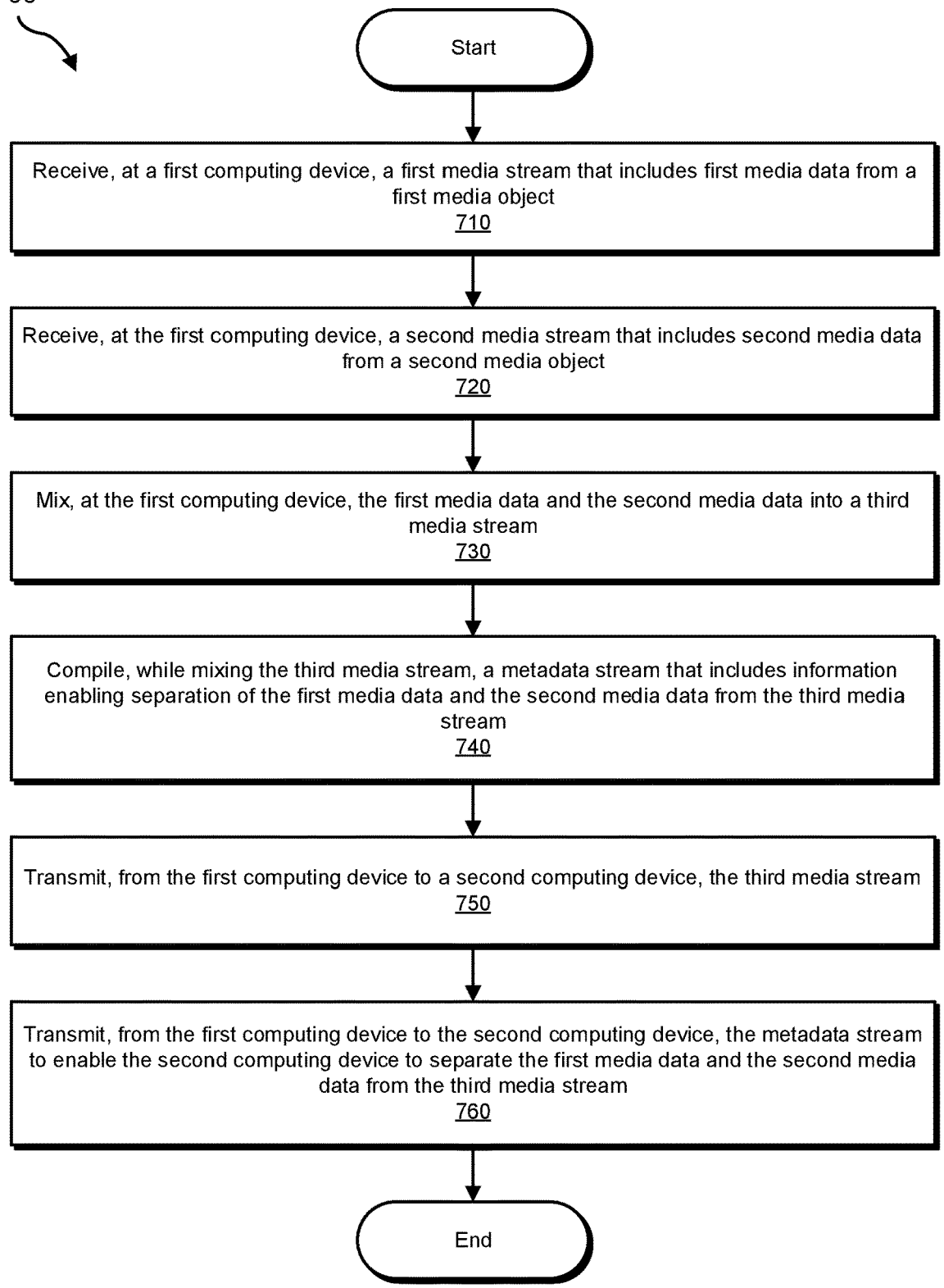
FIG. 7 is a flow diagram of an exemplary method for processing mixed media streams.

FIG. 7 is a flow diagram of an example computer-implemented method 700 for generating mixed media streams. The steps shown in FIG. 7 may be performed by any suitable computer-executable code and/or computing system, including system 400 in FIG. 4, system 500 in FIG. 5, system 600 in FIG. 6, and/or variations or combinations of one or more of the same. In one example, each of the steps shown in FIG. 7 may represent an algorithm whose structure includes and/or is represented by multiple sub-steps, examples of which will be provided in greater detail below.

As illustrated in FIG. 7, at step 710 one or more of the systems described herein may receive, at a first computing device, a first media stream that includes first media data from a first media object. At step 720 one or more of the systems described herein may receive, at the first computing device, a second media stream that includes second media data from a second media object. The systems described herein may receive media streams in a variety of contexts. In one example, the systems described herein may, as part of a server-side computing device hosting an audio or a video conference, receive an audio or video stream from the computing devices of each participant of the conference. Additionally or alternatively, the systems described herein may, as part of a client-side computing device enabling one or more users to participate in audio or video conference, receive an audio or video signal from each user participating in the audio conference via the client-side computing device.

The systems described herein may receive media streams in a variety of ways. In some examples, the systems described herein may receive multiple media streams via one or more microphones. For example, computing device 506 in FIG. 5 may receive stream 508 from a microphone configured to pick up audio of user 505 and may receive stream 510 from another microphone configured to pick up audio of user 507. In other examples, computing device 506 in FIG. 5 may receive streams 508 and 510 from a microphone array capable of beamforming. Additionally or alternatively, the systems described herein may receive one or more media streams from each of a number of different computing devices. For example, server 610 in FIG. 6 may receive stream 612 from computing device 602 and may receive stream 614 from computing device 604. All though not illustrated, in some examples, the systems described herein may receive multiple media streams from a single computing device as a mixed media stream. For example, server 610 as illustrated in FIG. 6, may receive media streams 508 and 510 from computing device 506 as mixed media stream 512.

Figure 11:
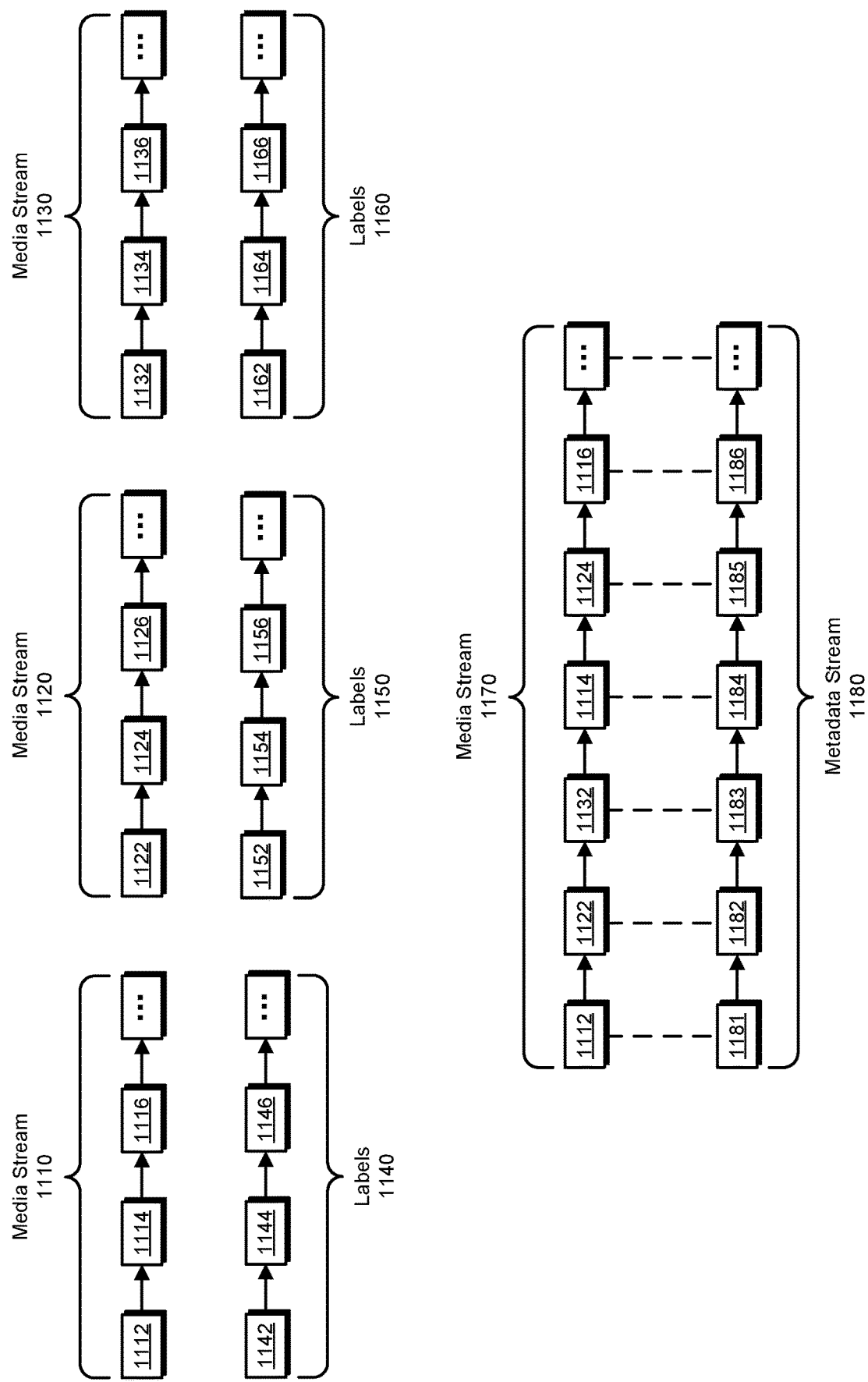
FIG. 11 is a block diagram of additional exemplary media streams, according to aspects of the present disclosure.
Figure 12:
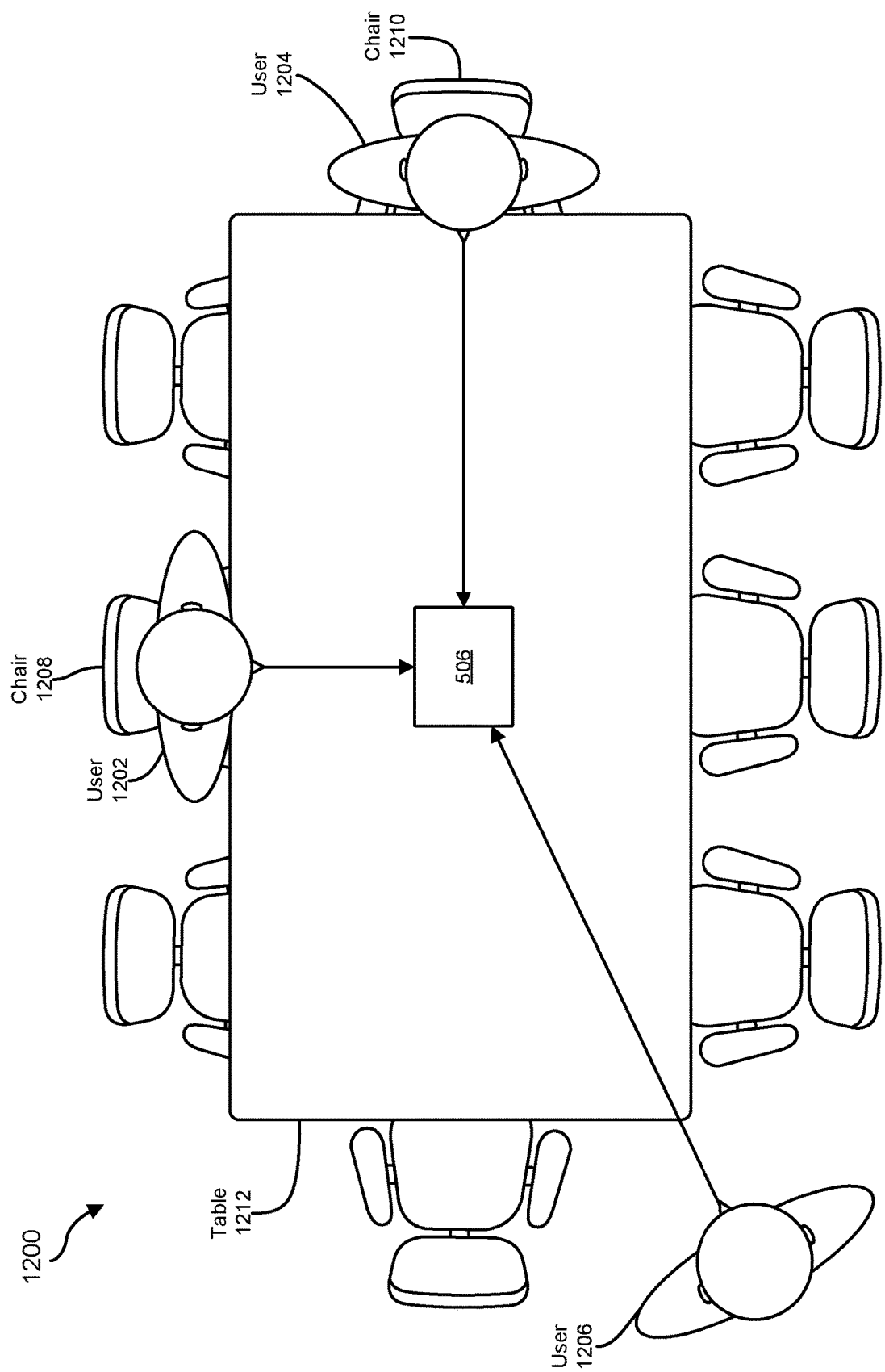
FIG. 12 is a diagram of an exemplary embodiment of the exemplary systems illustrated in FIGS. 4-6, according to aspects of the present disclosure.
Figure 13:
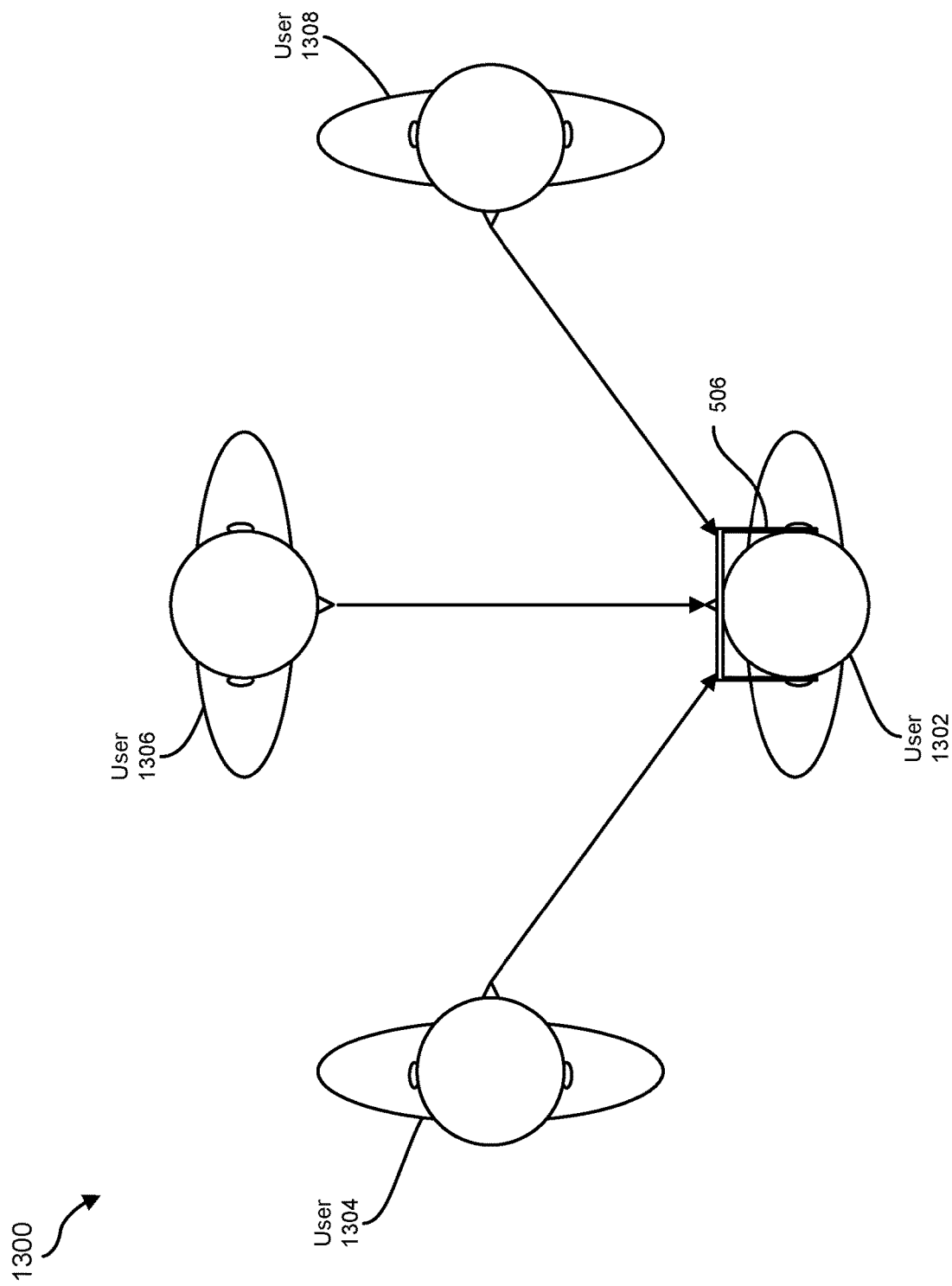
FIG. 13 is a diagram of another exemplary embodiment of the exemplary systems illustrated in FIGS. 4-6, according to aspects of the present disclosure.

In some examples, in addition to receiving media streams, the systems described herein may receive or generate labels for the media streams. For example, as shown in FIG. 11, the systems described herein may receive or generate labels 1140, labels 1150, and labels 1160 for media stream 1110, media stream 1120, and media stream 1130, respectively. In one example, the systems described herein may use a microphone array capable of spatial selectivity to track and/or receive audio streams from a sound field. In these examples, the systems described herein may label a captured audio stream with a label indicating the direction of arrival or location from which the audio stream was captured. Using FIG. 12 as an example, computing device 506 may use a microphone array capable of spatial selectivity to track and/or receive audio streams from environment 1200. For example, computing device 506 may use the microphone array to track and/or receive audio streams from user 1202, 1204, and 1206. In this example, computing device 506 may label the audio stream of user 1202 with the relative direction from which the audio stream of user 1202 was received. Computing device may likewise label the audio streams of users 1204 and 1206. Using FIG. 13 as another example, computing device 506 may use a microphone array capable of spatial selectivity to track and/or receive audio streams from environment 1300. For example, computing device 506 may use the microphone array to track and/or receive audio streams from users 1302, 1304, 1306, and/or 1308. In this example, computing device 506 may label the audio stream of user 1302 with the relative direction from which the audio stream of user 1302 was received. Computing device may likewise label the audio streams of users 1304, 1306, and 1308.

In some examples, the systems described herein may use a SLAM subsystem to map the environment from which one or more media streams are captured. In these examples, the systems described herein may label a captured media stream with a label indicating various attributes of the mapped sources of the captured media streams. Using FIG. 12 as an example, computing device 506 may use a SLAM subsystem to map environment 1200. In this example, computing device 506 may detect and map users 1202, 1204, and 1206 within environment 1200. In at least one example, computing device 506 may also detect and map chair 1208, chair 1210, and table 1212. In this example, computing device 506 may label the media stream of user 1202 with various attributes of user 1202 (e.g., a label indicating that user 1202 is a person, a label indicating that user 1202 was sitting in chair 1208, and/or a label indicating the relative direction from which the media stream of user 1202 was received by computing device 506). Computing device may similarly label the media streams of users 1204 and 1206.

In some examples, the systems described herein may capture media streams via a head-mounted device. In these examples, the systems described herein may label captured media streams with a label encoding the head pose and/or other attributes of the head-mounted device. Using FIG. 13 as an example, computing device 506 may track the head pose of user 1302 and may encode head-pose information within the labels assigned to the audio streams of users 1302, 1304, 1306, and/or 1308.

Figure 9:
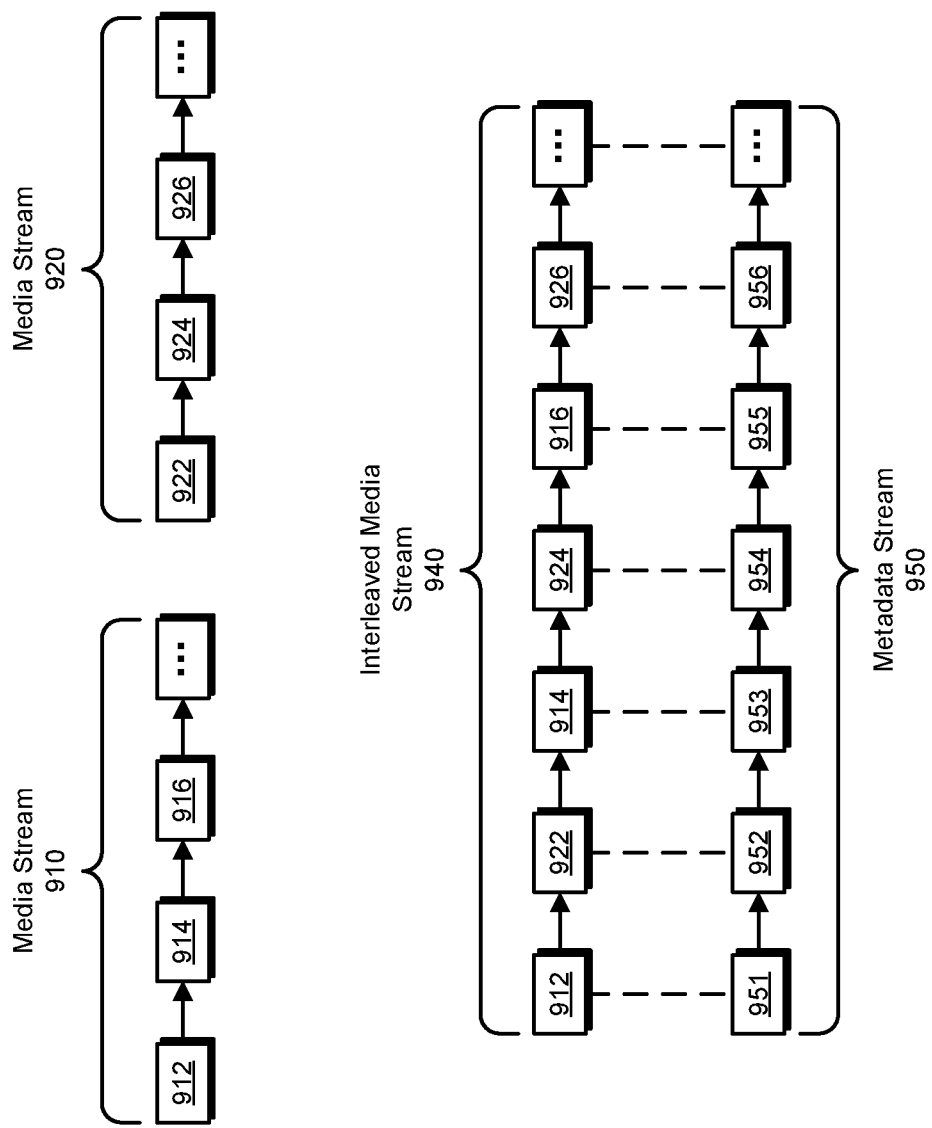
FIG. 9 is a block diagram of exemplary media streams, according to aspects of the present disclosure.

At step 730 one or more of the systems described herein may mix, at the first computing device, the first media data and the second media data into a third media stream. The systems described herein may mix the media data from two or more media streams into another media stream in a variety of ways. As illustrated in FIG. 9, the systems described herein may generate an interleaved media stream 940 from media stream 910 and media stream 920 by alternatingly merging media data from media stream 910 (e.g., media data 912-916) with media data from media stream 920 (e.g., media data 922-926), as shown. In this example, media stream 910 may represent media data of one media object, and media stream 920 may represent media data of another media object.

Figure 10:
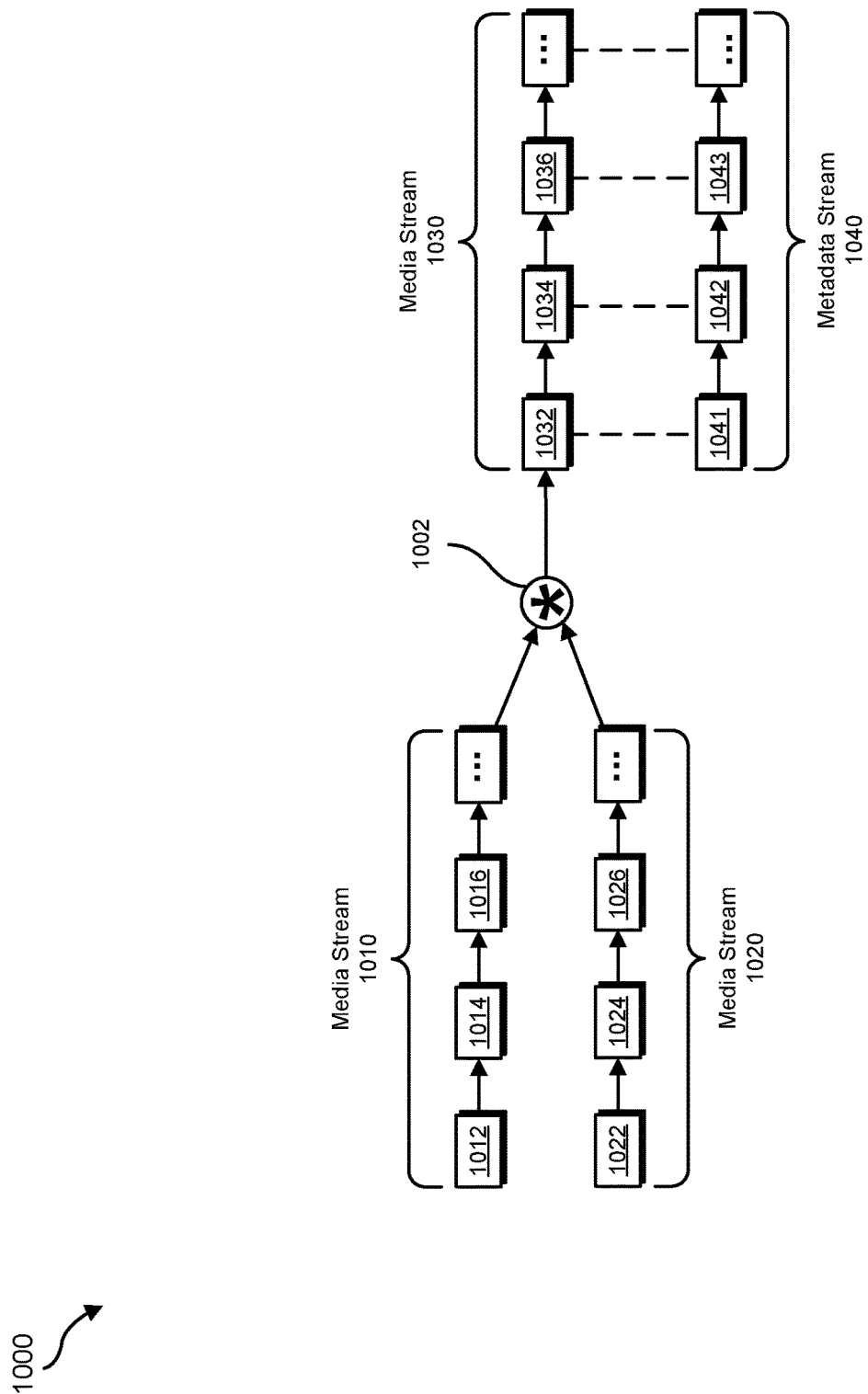
FIG. 10 is a flow diagram of an exemplary convolution operation performed on exemplary media streams, according to aspects of the present disclosure.

Alternatively, the systems described herein may generate a mixed media stream from two or more media streams by performing a suitable operation (e.g., a suitable machine learning algorithm) on components of two or more media streams. As illustrated in FIG. 10, the systems described herein may generate a media stream 1030 from media stream 1010 and media stream 1020 by performing a convolution operation 1002 on components of media stream 1010 and media stream 1020. In this example, the systems described herein may generate media data 1032 by performing convolution operation 1002 on media data 1012 and media data 1022. Likewise, the systems described herein may generate media data 1034 by performing convolution operation 1002 on media data 1014 and media data 1024. The systems described herein may generate the remainder of media stream 1030 in a similar fashion. The systems described herein may additionally or alternatively use any other suitable method or technique to mix individual media streams into a single mixed audio stream. For example, the systems described herein may use a suitable object-oriented sound format or a suitable full-sphere surround sound format to mix individual audio streams into a single audio stream.

In some examples, the systems described herein may refrain from mixing some or all of an individual media stream into a mixed media stream. Using FIG. 11 as an example, the systems described herein may generate media stream 1170 from media streams 1110, 1120, and 1130. In this example, media streams 1110, 1120, and 1130 may be temporally in sync (i.e., media data 1112, media data 1122, and media data 1132 may represent media data captured and/or received simultaneously). As shown, the systems described herein may refrain from mixing media data 1134 into media stream 1170.

The systems described herein may determine what media data should be mixed into a media stream in a variety of ways. In some examples, the systems described herein may mix or refrain from mixing media data into a media stream based on a policy decision and/or based on labels associated with the media data. For example, the systems described herein may mix or refrain from mixing media data from a certain user into a media stream based on a user-defined policy and/or based on labels associated with the media data that indicated the media data is from the certain user. In another example, the systems described herein may refrain from mixing media data of a certain type into a media stream based on a security or content policy and/or based on labels associated with the media data that indicated the media data is of the certain type (e.g., sensitive or objectionable).

In some examples, the systems described herein may selectively drop portions of media streams that a user would not be able to perceive. In one example, the systems described herein may refrain from mixing media data into a media stream using a psychoacoustic model configured to predict whether a user would be able to perceive the media data if presented to the user. For example, the systems described herein may refrain from mixing media data into a media stream if a psychoacoustic model predicts that the volume level of the media data would render the media data imperceptible. In another example, the systems described herein may refrain from mixing media data into a media stream if a psychoacoustic model predicts that a volume or a localization of other media data would cause the other media to mask the media data.

In some examples, the systems disclosed herein may generate custom mixed media streams on a per endpoint basis. Alternatively, the systems disclosed herein may generate mixed media streams on a per conversation. In some examples, the systems described herein may group one or more individual audio stream into a group audio stream before mixing the group audio stream with other audio streams (e.g., other individual media stream or other group media streams).

At step 740 one or more of the systems described herein may compile, while mixing the third media stream, a metadata stream that includes information enabling separation of the first media data and the second media data from the third media stream. Using FIG. 9 as an example, the systems described herein may compile, while mixing media stream 940, a metadata stream 950 that includes information 951-956. In this example, information 951-956 may identify the media stream from which each of media data 912, 922, 914, 924, 916, 926 was respectively drawn. As such, information 951-956 may enable separation of media data 912, 922, 914, 924, 916, and 926 from interleaved media stream 940. Using FIG. 10 as another example, the systems described herein may compile, while generating media stream 1030, a metadata stream 1040 that includes information 1041-1043. In this example, information 1041-1043 may contain information necessary for performing a deconvolution operation on media data 1032-1036 to respectively generate media data 1012-1016 and media data 1022-1026. As such, information 1041-1043 may enable separation of media data 1012-1016 and media data 1022-1026 from media stream 1030.

As mentioned above, the systems described herein may mix media streams into a single mixed media stream using any suitable machine-learning algorithm or operation. In these situations, the systems described herein may compile a metadata stream that includes codebook data, recipe data, coefficients, or any other information needed by a machine-learning algorithm or operation to separate a mixed media stream. In some examples, the systems describe herein may encode the labels that have been assigned to individual media streams into a metadata stream. Using FIG. 11 as an example, the systems described herein may encode labels 1142, 1152, 1162, 1144, 1154, and 1146 into metadata 1181, 1182, 1183, 1184, 1185, and 1186, respectively.

At step 750 one or more of the systems described herein may transmit, from the first computing device to a second computing device, the third media stream. At step 760 one or more of the systems described herein may transmit, from the first computing device to the second computing device, the metadata stream to enable the second computing device to separate the first media data and the second media data from the third media stream. In some examples, the systems and methods described herein may transmit a mixed media stream and its associated metadata stream as a single composite data stream. Alternatively, the systems and methods described herein may transmit a mixed media stream and its associated metadata stream as separate data streams.

Figure 8:
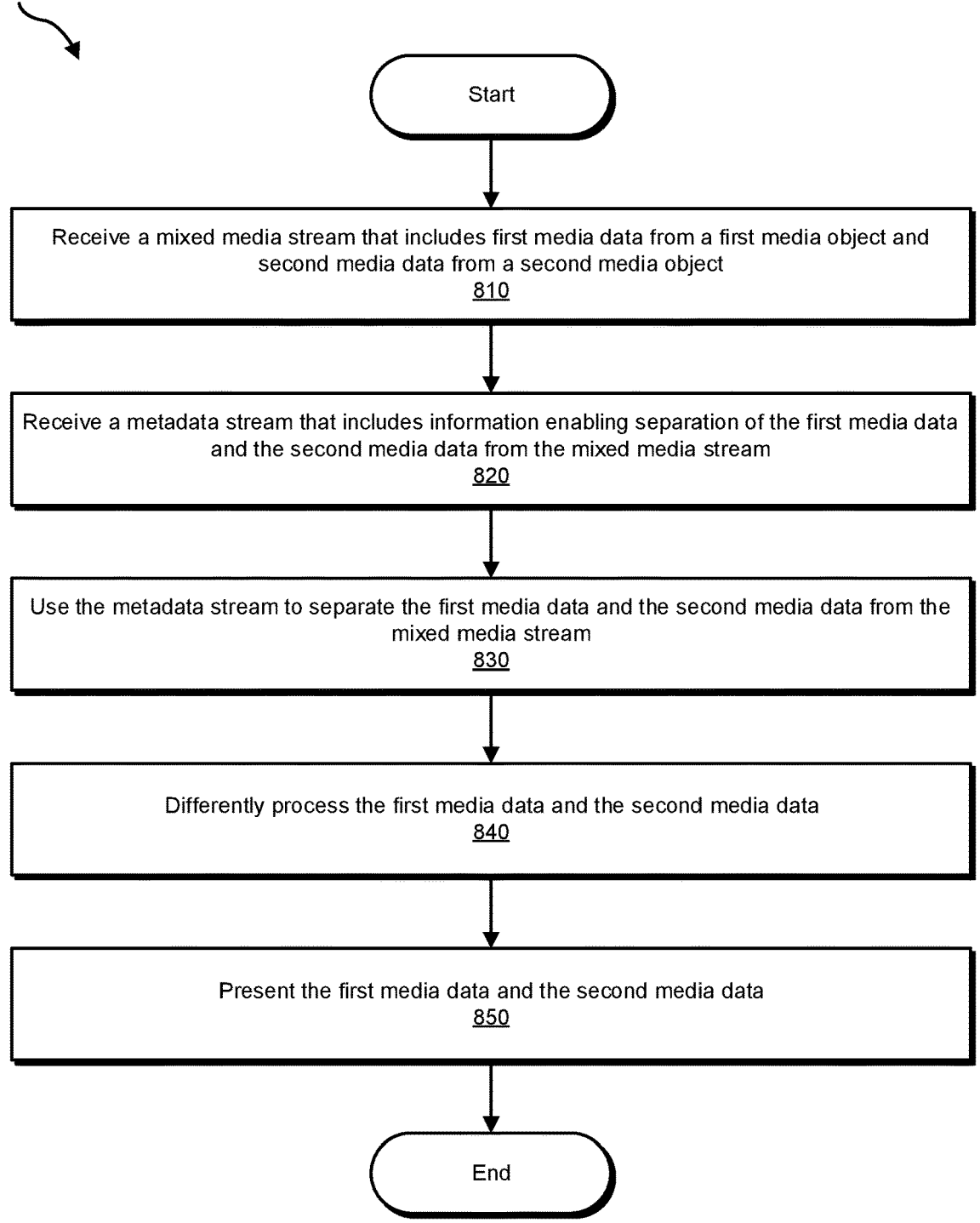
FIG. 8 is a flow diagram of another exemplary method for processing mixed media streams.

FIG. 8 is a flow diagram of an example computer-implemented method 800 for separating and differently processing media streams from a mixed media stream. The steps shown in FIG. 8 may be performed by any suitable computer-executable code and/or computing system, including system 400 in FIG. 4, system 500 in FIG. 5, system 600 in FIG. 6, and/or variations or combinations of one or more of the same. In one example, each of the steps shown in FIG. 8 may represent an algorithm whose structure includes and/or is represented by multiple sub-steps, examples of which will be provided in greater detail below.

As illustrated in FIG. 8, at step 810 one or more of the systems described herein may receive a mixed media stream that includes first media data from a first media object and second media data from a second media object. At step 820 one or more of the systems described herein may receive a metadata stream that includes information enabling separation of the first media data and the second media data from the mixed media stream.

At step 830 one or more of the systems described herein may use the metadata stream to separate the first media data and the second media data from the third media stream. At step 840 one or more of the systems described herein may differently process the first media data and the second media data. At step 850 one or more of the systems described herein may present the first media data and/or the second media data.

After separating individual media streams from a mixed media stream, the systems described herein may process the individual media streams differently before or while presenting the individual media streams to a user. For example, the systems described herein may spatially localize the individual media streams at different spatial locations in the user's auditory field. In at least one example, the individual media streams may be presented to a user via a head-mounted device capable of measuring a head pose of the user. In these examples, the systems described herein may spatially localize the individual media streams relative to the head pose of the user. In other examples, the systems described herein may independently adjust the volume levels (e.g., based on user input) of the individual media streams. In other examples, the systems described herein may present less than all of the individual media streams to the user. In one example, the systems described herein may enable a user to mute or turn off the display of certain media streams.

In some examples, the systems described herein may enable users to participate in a virtualized conference or environment. In these examples, the systems described herein may enable each user to configure their own version of the virtualized conference or environment (e.g., by enabling a user to configure a virtual or mixed-reality environment in which audio sources may be placed in whatever way desired). In these examples, the systems described herein may enable each user to locate participants of the virtualized conference within the virtual or mixed-reality environment. In these examples, the systems described herein may present individual media streams of the participants of the virtual conference at the proper spatial locations relative to the user.

As explained above, embodiments of the instant disclosure may mix individual media streams from two or more sources into a single mixed media stream that may be sent to a remote device for additional processing or presentation. Embodiments of the instant disclosure may compile additional side-channel information that distinguishes/spatializes the individual media streams within the mixed media stream and may send the additional side-channel information to the remote device to enable the remote device to extract and/or process the individual media streams from the mixed media stream. By enabling the remote device to extract and/or process individual media streams from a single mixed media stream, embodiments of the instant disclosure may enable the remote device to amplify or attenuate individual media streams or remix the mixed media stream to re-localize the individual media streams before presentation to a user. Accordingly, the disclosed systems may improve upon existing audio conferencing, video conferencing, and other media streaming technologies by, among other things, providing a user with a single mixed audio or video stream containing a mix of the audio and video streams of the other users in the user's conference from which the user may extract and individually process or control the audio or video streams of the other users.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive multiple media streams to be transformed, transform the multiple media streams into a single mixed media stream and a metadata stream containing information enabling another computing device to separate the multiple media streams from the single mixed media stream, output a result of the transformation to the other computing device, use the result of the transformation to separate, at the other computing device, the multiple media streams from the single mixed media stream, and differently process the multiple media streams at the other computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at a server device, a first media stream comprising first media data from a first media object, wherein the first media data was captured by one of:
   the server device; or
   a first client device;
   receiving, at the server device, a second media stream comprising second media data from a second media object, wherein the second media data was captured by one of:
   the server device;
   the first client device; or
   a second client device;
   mixing, at the server device, the first media data and the second media data into a third media stream;
   compiling, while mixing the third media stream, a metadata stream comprising information enabling:
   client-side unmixing of the first media data and the second media data from the third media stream; and
   client-side processing of the first media data separate from the second media data;
   transmitting, from the server device to one or more additional devices, the third media stream; and
   transmitting, from the server device to the one or more additional devices, the metadata stream to enable each of the one or more additional devices to:
   unmix the first media data and the second media data from the third media stream; and
   process the first media data separate from the second media data.

2. The computer-implemented method of claim 1, further comprising:
   receiving, at the one or more additional devices, the third media stream;
   receiving, at the one or more additional devices, the metadata stream;
   using, at the one or more additional devices, the metadata stream to unmix the first media data and the second media data from the third media stream; and
   differently processing, at the one or more additional devices, the first media data and the second media data.

3. The computer-implemented method of claim 2, wherein differently processing the first media data and the second media data comprises spatially localizing, at the one or more additional devices while presenting the first media data and the second media data to a user of the one or more additional devices, the first media data and the second media data at different spatial locations in the user's auditory field.

4. The computer-implemented method of claim 3, wherein:
   the one or more additional devices comprise a head-mounted device capable of measuring a head pose of the user; and
   the first media data and the second media data are spatially localized relative to the head pose of the user.

5. The computer-implemented method of claim 2, wherein differently processing the first media data and the second media data comprises independently adjusting, at the one or more additional devices, a volume level of the first media data and a volume level of the second media data.

6. The computer-implemented method of claim 1, wherein:
   the first media stream is received from the first client device;
   the first media object is a user of the first client device;
   the second media stream is received from the second client device;
   the second media object is a user of the second client device;
   the server device is a cloud-based server hosting a virtualized conference for a user of the one or more additional devices, the user of the first client device, and the user of the second client device; and
   the computer-implemented method further comprises:
   capturing, at the first client device, the first media data from the user of the first client device; and
   capturing, at the second client device, the second media data from the user of the second client device.

7. The computer-implemented method of claim 1, further comprising:
   receiving, at the server device, a fourth media stream comprising third media data from a third media object;
   using a psychoacoustic model to predict that a user of the one or more additional devices would be unable to perceive the third media data if presented to the user of the one or more additional devices; and
   refraining, at the server device, from mixing the third media data into the third media stream.

8. The computer-implemented method of claim 1, wherein:
   the one or more additional devices comprise a third client device and a fourth client device; and
   the computer-implemented method further comprises:
   receiving, at the third client device, the third media stream and the metadata stream;
   receiving, at the fourth client device, the third media stream and the metadata stream;
   using, at each of the third client device and the fourth client device, the metadata stream to unmix the first media data and the second media data from the third media stream; and
   performing, at the third client device, a first operation on the first media data but not the second media data;
   performing, at the fourth client device, a second operation on the first media data but not the second media data, wherein the first operation and the second operation are different operations.

9. The computer-implemented method of claim 1, wherein:
the metadata stream further comprises at least one label of the first media data and at least one label of the second media data;
the server device comprises a sensor array capable of spatial selectivity;
receiving the first media stream comprises capturing, by the server device via the sensor array, the first media data from a first direction in a sound field;
receiving the second media stream comprises capturing, by the server device via the sensor array, the second media data from a second direction in the sound field;
the at least one label of the first media data comprises the first direction; and
the at least one label of the second media data comprises the second direction.

10. The computer-implemented method of claim 1, wherein:
the metadata stream further comprises at least one label of the first media data and at least one label of the second media data;
the first client device comprises a simultaneous mapping and localization subsystem configured to map an environment of the first client device and localize the first client device within the environment;
receiving the first media stream comprises receiving the first media stream from the first client device;
receiving the second media stream comprises receiving the second media stream from the first client device;
the computer-implemented method further comprises:
capturing, by the first client device, the first media data from a first object in the environment; and
capturing, by the first client device, the second media data from a second object in the environment;
the at least one label of the first media data comprises an attribute of the first object; and
the at least one label of the second media data comprises an attribute of the second object.

11. The computer-implemented method of claim 1, wherein:
mixing the first media data and the second media data into the third media stream comprises performing a convolution operation on the first media data and the second media data to produce the third media stream;
the information enabling unmixing of the first media data and the second media data from the third media stream comprises information enabling, at each of the one or more additional devices, a deconvolution operation to be performed on the third media stream to produce the first media data and the second media data; and
at least one of the one or more additional devices unmixes the first media data and the second media data from the third media stream by performing the deconvolution operation on the third media stream.

12. A computer-implemented method comprising:
receiving, at one or more client devices from a server device, a media stream comprising first media data from a first media object and second media data from a second media object, wherein:
the server device mixed the first media data and the second media data into the media stream;
the first media data was captured by one of:
the server device; or
a first additional client device; and
the second media data was captured by one of:
the server device;
the first additional client device; or
a second additional client device;
receiving, at the one or more client devices from the server device, a metadata stream comprising information enabling:
client-side extraction of the first media data and the second media data from the media stream; and
client-side processing of the first media data separate from the second media data;
using, at each of the one or more client devices, the metadata stream to extract the first media data and the second media data from the media stream;
differently processing, at each of the one or more client devices, the first media data and the second media data; and
presenting, to a user of each of the one or more client devices, the first media data or the second media data.

13. The computer-implemented method of claim 12, wherein differently processing the first media data and the second media data comprises spatially localizing, at the one or more client devices before presenting the first media data and the second media data, the first media data and the second media data at different spatial locations in the user's auditory field.

14. The computer-implemented method of claim 13, further comprising measuring a head pose of the user, wherein the first media data and the second media data are spatially localized relative to the head pose of the user.

15. The computer-implemented method of claim 12, wherein differently processing the first media data and the second media data comprises independently adjusting, at the one or more client devices, a volume level of the first media data and a volume level of the second media data.

16. A system comprising:
at least one physical processor; and
physical memory comprising computer-executable instructions that, when executed by the physical processor, cause the physical processor to:
receive, at a server device, a first media stream comprising first media data from a first media object, wherein the first media data was captured by one of:
the server device; or
a first client device;
receive, at the server device, a second media stream comprising second media data from a second media object, wherein the second media data was captured by one of:
the server device;
the first client device; or
a second client device;
mix, at the server device, the first media data and the second media data into a third media stream;
compile, while mixing the third media stream, a metadata stream comprising information enabling:
client-side unmixing of the first media data and the second media data from the third media stream; and
client-side processing of the first media data separate from the second media data;
transmit, from the server device to one or more additional devices, the third media stream; and transmit, from the server device to the one or more additional devices, the metadata stream to enable each of the one or more additional devices to:
  unmix the first media data and the second media data from the third media stream; and
  process the first media data separate from the second media data.

17. The system of claim 16, wherein:
the first media stream is received from the first client device;
the first media object is a user of the first client device;
the second media stream is received from the second client device;
the second media object is a user of the second client device; and
the server device is a cloud-based server hosting a virtualized conference for a user of the one or more additional devices, the user of the first client device, and the user of the second client device.

18. The system of claim 16, wherein the physical memory further comprises additional computer-executable instructions that, when executed by the physical processor, cause the physical processor to:
receive, at the server device, a fourth media stream comprising third media data from a third media object;
use a psychoacoustic model to predict that a user of the one or more additional devices would be unable to perceive the third media data if presented to the user of the one or more additional devices; and
refrain, at the server device, from mixing the third media data into the third media stream.

19. The system of claim 16, wherein:
the metadata stream further comprises at least one label of the first media data and at least one label of the second media data;
the server device comprises a sensor array capable of spatial selectivity;
the sensor array receives the first media stream from a first direction in a sound field;
the sensor array receives the second media stream from a second direction in the sound field;
the at least one label of the first media data comprises the first direction; and
the at least one label of the second media data comprises the second direction.

20. The system of claim 16, wherein:
the metadata stream further comprises at least one label of the first media data and at least one label of the second media data;
the first client device comprises a simultaneous mapping and localization subsystem configured to map an environment of the first client device and localize the first client device within the environment;
the first media data is captured by the first client device from a first object in the environment;
the second media data is captured by the first client device from a second object in the environment;
the at least one label of the first media data comprises an attribute of the first object; and
the at least one label of the second media data comprises an attribute of the second object.

* * * * *